Figure 6:
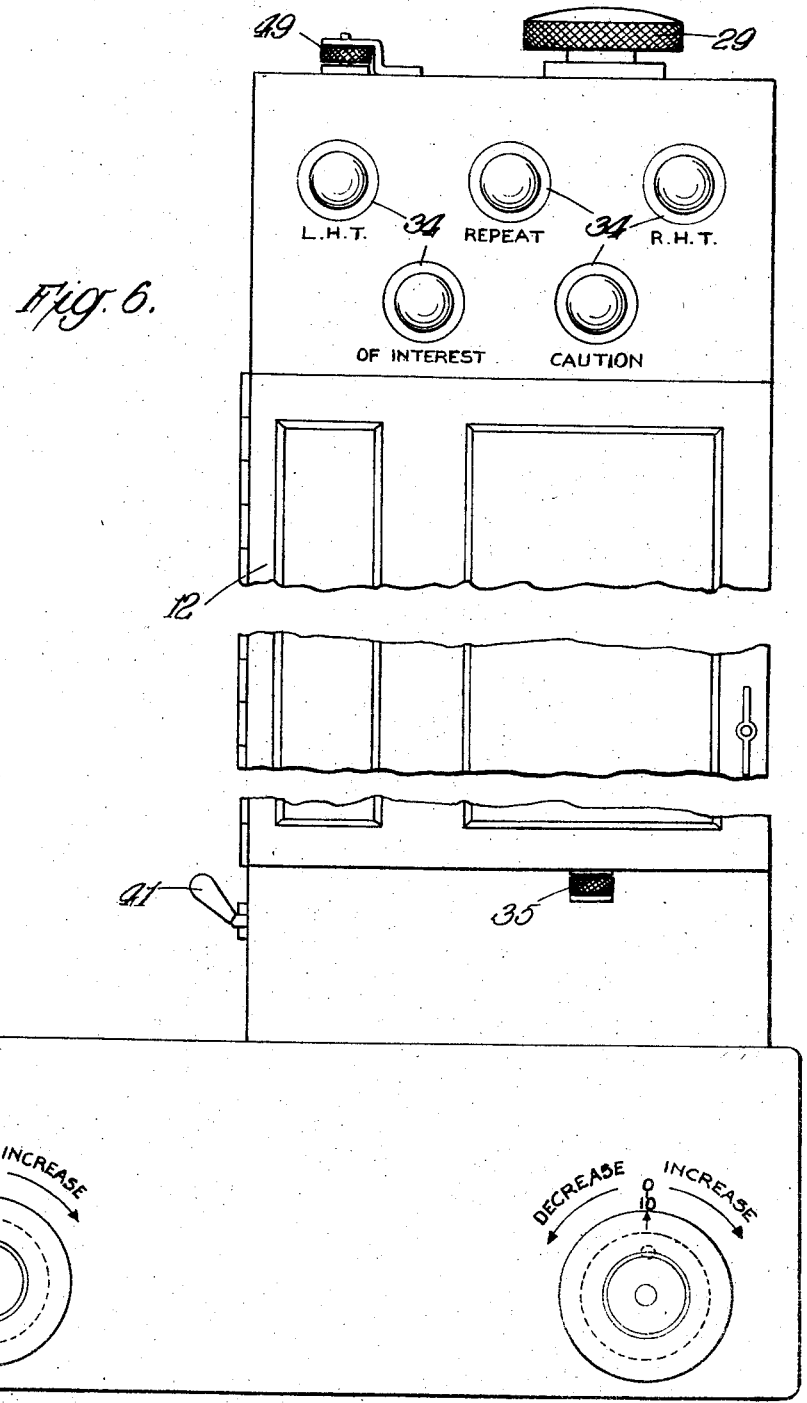

Jan. 24, 1939.  H. S. WEST  2,144,949
ROUTE INDICATING DEVICE
Filed Jan. 25, 1938   6 Sheets-Sheet 1
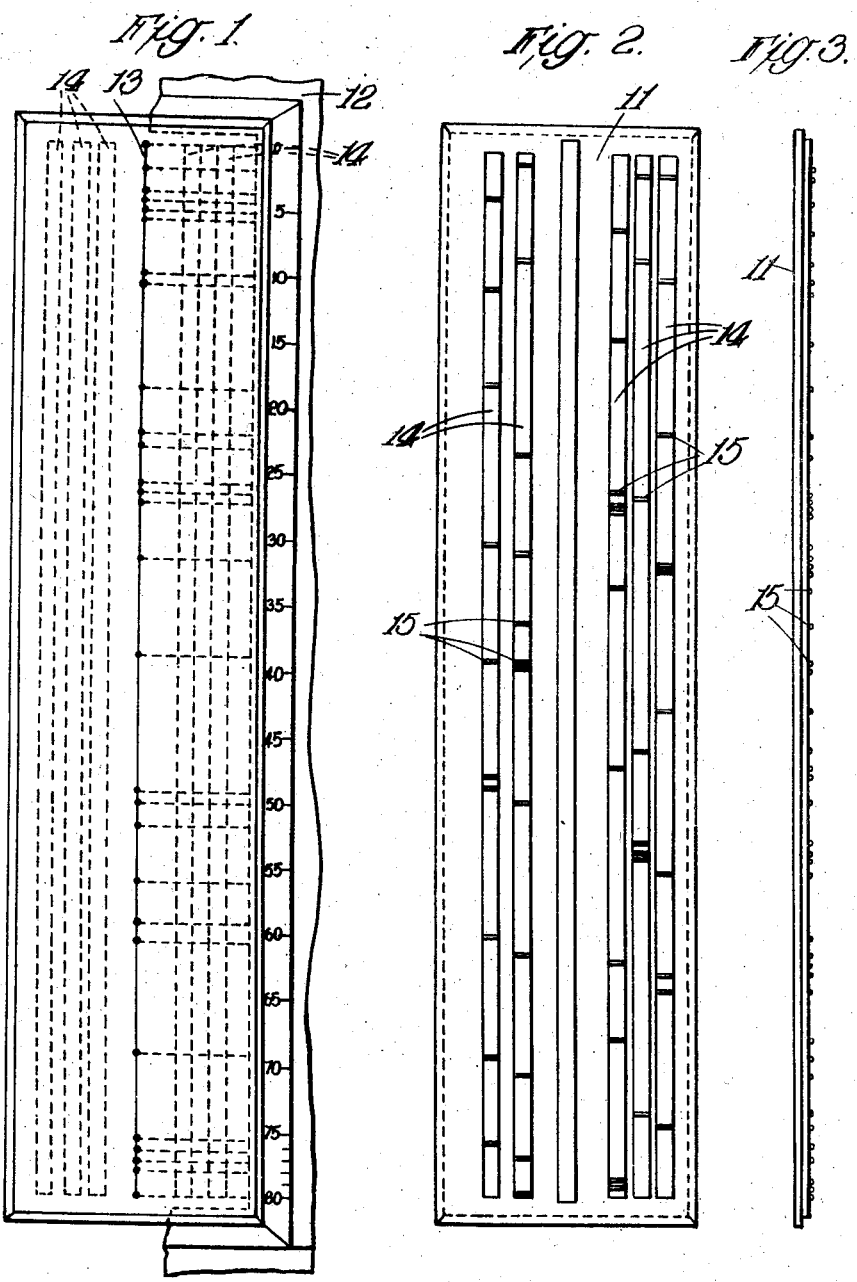
INVENTOR
HAROLD SIMPSON WEST
BY
Hammond & Littell
ATTORNEYS

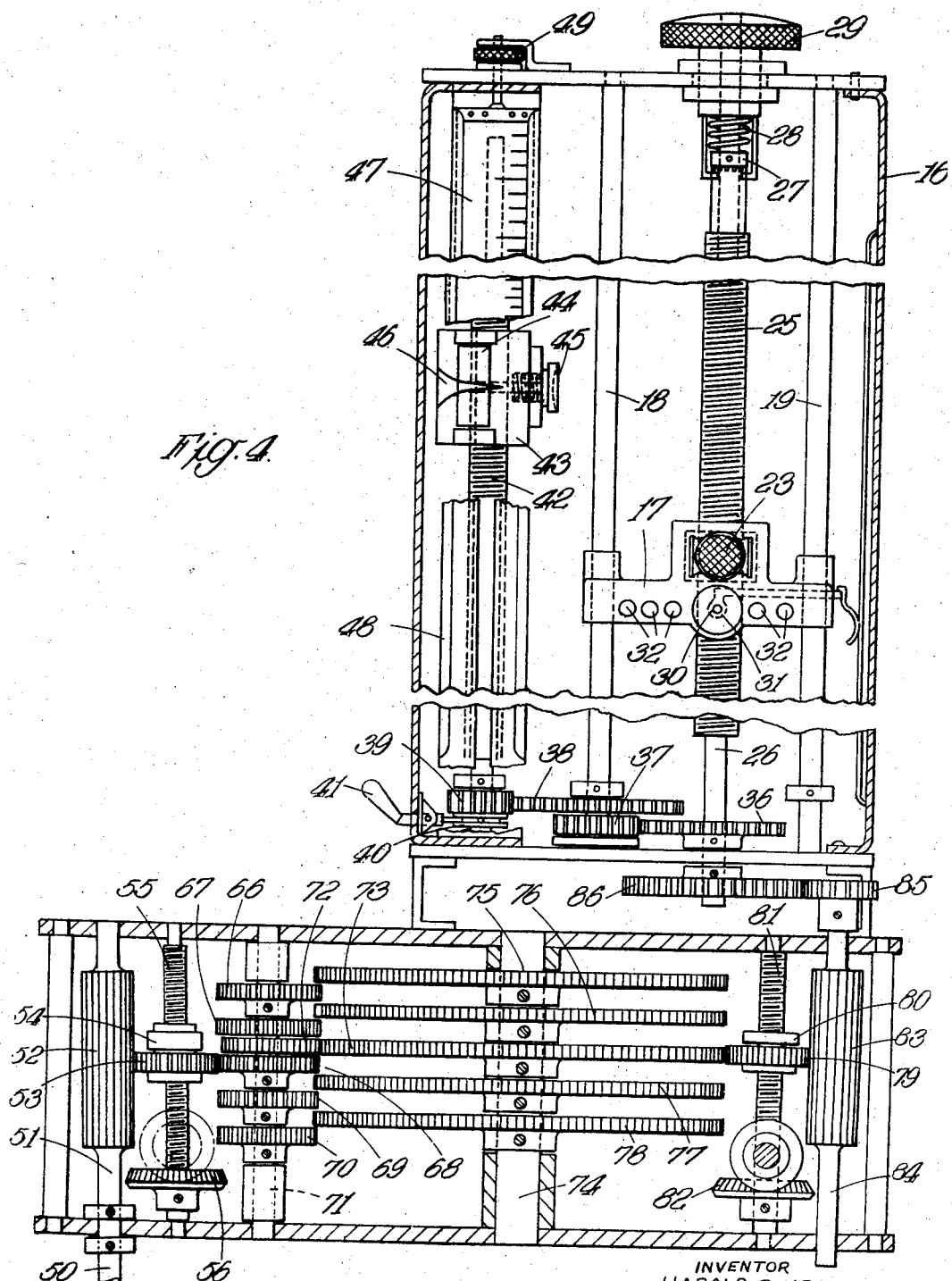

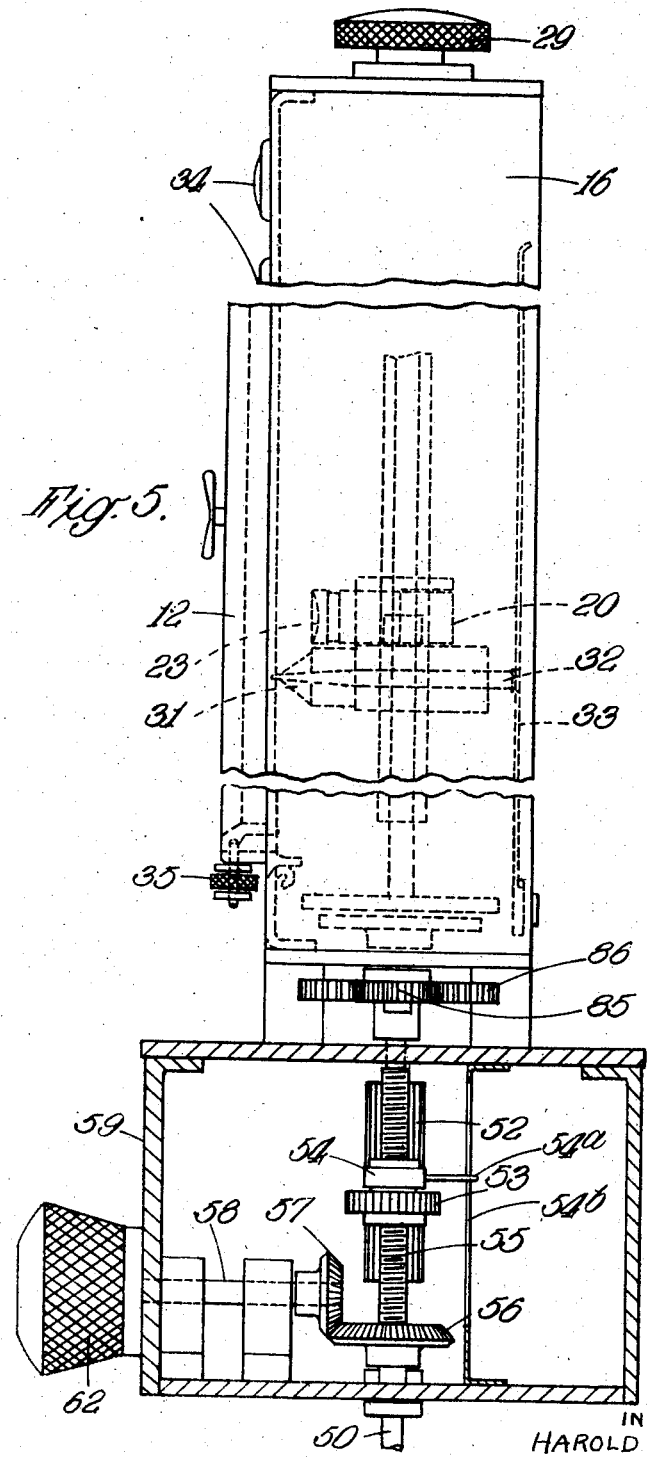

Jan. 24, 1939.  H. S. WEST  2,144,949
ROUTE INDICATING DEVICE
Filed Jan. 25, 1938   6 Sheets-Sheet 4

INVENTOR
HAROLD SIMPSON WEST
BY Hammond & Littell
ATTORNEYS

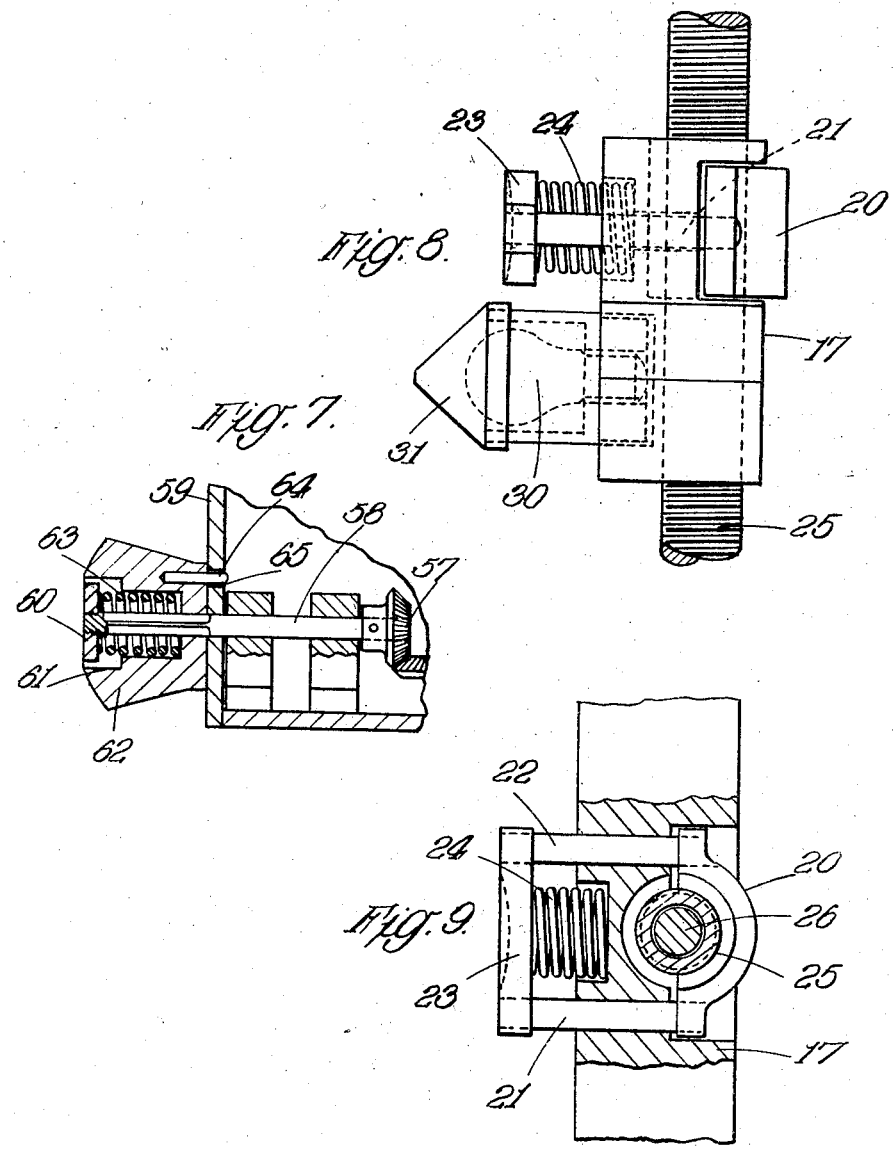

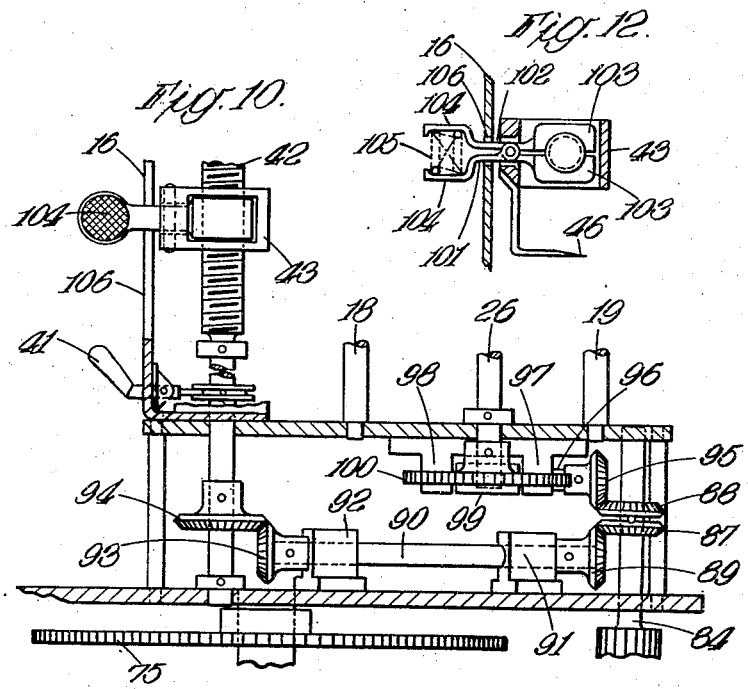
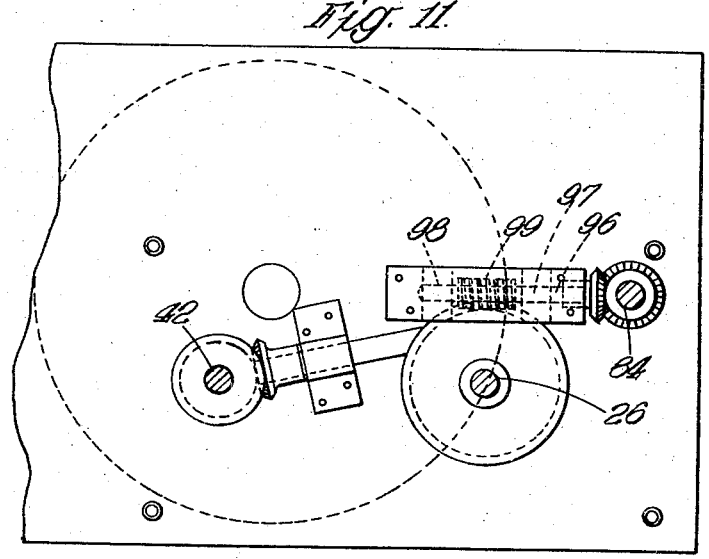

Patented Jan. 24, 1939

2,144,949

UNITED STATES PATENT OFFICE 2,144,949

ROUTE INDICATING DEVICE

Harold Simpson West, Romford, England

Application January 25, 1938, Serial No. 186,851
In Great Britain February 5, 1937

3 Claims. (Cl. 40—42)

A route indicating device is known in which a diagrammatic map of a route to be followed is moved relatively to indicating means said map being driven directly or indirectly by the propeller shaft or the road wheels of a vehicle so that the driver of the vehicle may be apprised of his position, at any given moment, during the course of his journey and may have his attention called to objects of interest, danger spots and so on. The object of the present invention is to provide an improved indicating device of this general character.

To this end and in accordance with the invention the device includes a route card or the like (bearing a diagrammatic representation of a map showing a route to be followed) which may be moved relatively to indicating means said route card or the like being formed with cam surfaces, apertures or the like adapted to coact with spring pressed plungers (constituting part of the indicating means) which control the circuits of a plurality of lights or other indicators for intimating to the driver of a vehicle the proximity of danger points in the route, places of interest, major turns and the like. The route card or the like may be movable and driven from the propeller shaft or the wheels of the vehicle whilst the indicating means are stationary or vice versa. For example the route card or the like may be a straight strip and the indicating means may be mounted on a carriage movable relatively to said card or the like by a fine pitch screw driven, e. g. from the propeller shaft, or the card or the like may be circular (or a straight card or the like may be bent into cylindrical form) and driven relatively to stationary indicating means. If the card or the like be circular it may be annular, the usual speedometer face being exposed through a space at the centre of said card or the like.

The movable element of the route indicating device may be driven through variable speed transmission mechanism, whilst a movable member of a subsidiary indicating device is driven through step up gearing, said subsidiary indicating device including a distance indicating card or the like upon a correspondingly larger scale than the route card or the like, and means being provided for interrupting at will the drive to the movable member of the subsidiary indicating device.

One form of the invention will now be described by way of example with reference to the accompanying diagrammatic drawings of which Figures 1, 2 and 3 are respectively front, rear and side elevations of a route card; Figure 4 is a sectional front elevation of the indicating and testing mechanism parts being broken away and parts being omitted for the sake of clearness, Figure 5 is a part sectional side elevation parts being broken away, Figure 6 is a front elevation of the device and Figures 7, 8 and 9 are views of details to a larger scale, Figures 10 and 11 are respectively a fragmentary sectional front elevation and a fragmentary plan of a modification, and Figure 12 shows a detail of a part shown in Figure 10.

As shown in Figures 1, 2 and 3 the route card or the like consists of an elongated rectangular strip 11 of translucent Celluloid or the like adapted to slide into grooves formed in the door 12 (Figures 5 and 6) of the device. This so-called "card" 11 bears centrally along its length a diagrammatic representation indicated at 13 (Figure 1) of the route to be followed and at the sides indications with regard to danger spots, turnings and so on whilst upon its rear face it carries strips 14 formed with cam surfaces 15 (Figures 2 and 3) for a purpose which will be apparent hereinafter. The door 12 is hinged to the casing 16 of the device and behind said door there is provided a carriage 17, slidable upon suitable guides 18, 19 and carrying a half nut 20, (see particularly Figures 8 and 9). Said half nut is carried on the ends of rods 21, 22 slidable in the carriage 17 and the other ends of said rods carry a push button 23 which is urged by a spring 24 in the direction to cause the half nut 20 to engage with a fine pitched screw-threaded tubular member 25.

Coaxially through said tubular member 25 there extends a rod 26 which may be driven through variable speed gearing to be described hereinafter from the mileage recording mechanism of the usual speedometer and which carries at its upper end a collar 27 formed at its lower side with serrations normally engaging corresponding serrations upon the upper end of the screw-threaded tubular member 25; said collar 27 and said tubular member 25 are normally urged into operative engagement by a spring 28 abutting at one end against said collar 27 and at the other end against the under surface of a knob 29 (slidable axially of the rod 26).

The carriage 17 is provided with a lamp 30 (Figure 8) which shines a pin point of light through a shade 31 upon the diagrammatic representation 13 of the route, and with five plungers 32 each of which is spring urged towards one of five sets of the cam surfaces 15 which are arranged lengthwise of the card 11. The arrangement is such that depression of each plunger 32 causes the plunger to abut against a contact strip 33 whereby the electrical circuit of an appropriate lamp 34, is completed, to give to the driver of the vehicle a suitable indication.

It will be appreciated that as the driver proceeds upon his journey the carriage 17 moves lengthwise of the diagrammatic representation 13 of the route and the pin point of light indicates to the driver his position at a given instant, whilst turns to the right or left, danger points and the like will be indicated, preferably in advance, by the respective lamps 34, actuated by the plungers 32, which lamps 34 are conveniently coloured. At one side of the card 11 is indicated the distance in miles from the objective, thus the driver may ascertain readily how far he has to go.

It will be appreciated that when a plunger 32 is pushed back by a cam 15, the circuit of the appropriate lamp 34 will be closed, whilst the vehicle travels an appreciable distance, and in case necessity should arise to give a second similar indication before the vehicle has travelled the appreciable distance just mentioned, one of the sets of cams 15 is provided to operate the plunger 32 to close the circuit of the appropriate lamp 34 to indicate to the driver that the signal last given by the apparatus is to be considered as repeated. For example, after the apparatus has indicated that a turn is to be made towards the right, it may be necessary for a second turn to be made towards the right before the circuit of the appropriate indicating lamp has been broken, and this necessity is indicated by the lighting of the "repeat" lamp 34.

If due to any error, (for example inaccuracy in the speedometer) the pin point of light does not indicate accurately the position of the vehicle upon the route the carriage may be adjusted rapidly by depressing the knob 29 (thus releasing the tubular member 25 from the rod 26) and turning it in the appropriate direction, whilst, by forcing the half nut 20 out of engagement with the screw threads upon the tubular member 25 the carriage may be rapidly reset when a new route card is to be inserted into the door 12 preparatory to a further trip. In order that the pin point of light may be caused to shine exactly on the initial indication on the route card 11 when the carriage 17 is in its lowest position, a thumb screw 35 (Figures 5 and 6) on the base of the door 12 is provided for adjusting the route card 11 relatively to the carriage 17.

The rod 26 is interconnected with a testing device through step up gearing and, as shown in Figure 4, the rod 26 drives, through the gear wheels 36, 37, and 38, a pinion 39 which may be connected through a clutch 40, controlled by a lever 41, with an externally screw-threaded rod 42. A carriage 43 carries a half nut 44 which engages with the screw-threaded rod 42 but which may be disengaged therefrom by a push button 45 in the manner described in connection with the half nut 20. Said carriage 43 carries a pointer 46 which projects in front of a card 47, bearing a scale of miles, mounted in front of the carriage 43 in appropriate guides 48. A thumb screw 49 is mounted in the upper wall of the casing 16 for the purpose of adjusting the card 47 relatively to the pointer 46. It will be appreciated that, since the pointer 46 coacting with the card 47 prevents rotation of the carriage 43 relatively to the rod 42, rotation of said rod will cause axial movement of the carriage 43 therealong whilst, by disengaging the half nut 44 from the rod 42 by means of the push button 45, the carriage 43 may be reset when desired to the zero reading on the scale of miles upon the card 47.

The rod 26 is driven from the speedometer through variable speed gearing illustrated in the lower part of Figure 4 and as shown a flexible shaft 50 connected with the speedometer drives a shaft 51 which carries a broad toothed pinion 52, and it will be noted that the shaft 51 is inclined to the vertical for a purpose which will be apparent hereinafter. Said pinion 52 meshes with a pinion 53 freely rotatable on an internally screw-threaded bushing 54 which coacts with a screw-threaded rod 55, which is also inclined to the vertical. Said bushing 54 is provided with a projecting pin 54ª (Figure 5) which passes through a slotted guide 54ᵇ and thus prevents rotation of said bushing 54. Said screw-threaded rod 55 carries at its lower end a bevel gear wheel 56 which meshes with a bevel gear wheel 57 (Figures 5 and 7) fast on a shaft 58 which extends through a panel 59 (Figures 5 and 7) and terminates in a block 60 which is accommodated within a recess 61 formed in a knob 62. Said knob is urged by a spring 63 towards the panel 59 and carries a pin 64 which normally engages with a hole 65 drilled in the panel 59. It will be appreciated that by pulling the knob 62 outwardly against the pressure of the spring 63, the pin 64 is withdrawn from the hole 65 so that the knob may be turned to cause the bushing 54 and pinion 53 to be moved axially of the screw-threaded rod 55. In this manner the pinion 53 can be brought into engagement with any one of a series of pinions 66, 67, 68, 69, and 70, mounted on a rotatable vertical shaft 71, said pinions having a progressively smaller number of teeth from the pinion 66 to the pinion 70. The difference in diameter of the pinions 66 to 70 is compensated by the inclination to the vertical of the screw-threaded rod 55. Also fast upon the rotatable shaft 71 is a pinion 72 which meshes constantly with a gear wheel 73 mounted on a rotatable shaft 74. Said shaft 74 also carries gear wheels 75, 76, 77, and 78, the number of teeth of which decreases progressively from the gear wheel 75 to the gear wheel 78. Any one of the gear wheels 75 to 78 may be meshed with a pinion 79 rotatable on a screw-threaded bushing 80 (corresponding in all respects with the bushing 54) which coacts with a screw-threaded shaft 81, inclined to the vertical, and carrying, at its lower end, a bevel gear wheel 82, it being understood that the bushing 80 and pinion 79 may be moved axially of the screw-threaded shaft 87 in a manner identical to that described with reference to bushing 54 and pinion 53. The pinion 79 meshes with a broad toothed pinion 83 mounted on a shaft 84 which is inclined to the vertical, and said shaft 84 also carries a pinion 85 meshing with a gear wheel 86 fast on the rod 26. The relative number of teeth on the gear wheels and pinions of the variable speed gear is such that lowering or raising the gear ratio, by moving the pinion 53 out of mesh with one of the pinions 66—70, and into mesh with an adjacent pinion, causes a difference in the distance indicated on the route card 11 of 40 yards when the distance travelled is a true mile, whilst movement of the pinion 79 out of mesh with one of the gear wheels 75 to 78 and into mesh with an adjacent gear wheel causes a difference in the distance indicated on the route card of 10 yards. The panel 59 may be marked with the appropriate indications as indicated in Figure 6.

Errors in the indicating device may be determined in the following manner:—

The carriage 43 is set to the zero reading on the card 47 by disengaging the half nut 44 from the screw-threaded rod 42. The clutch 40 is then engaged as the vehicle passes a milestone, and when, say, the third milestone is reached, the clutch 40 is disengaged and the distance, shown by the pointer 46 upon the card 47, is noted. Suppose that the distance recorded is 3 miles and 150 yards, then the error is 50 yards per mile.

To correct this error it will be sufficient to turn the knob 62, appertaining to the pinion 53, one complete turn in a direction to decrease the gear ratio between the flexible shaft 50 and the rod 26, and to turn the knob 62, appertaining to the pinion 79, one complete turn in a like direction. It will be appreciated that the maximum error after correction has been made cannot exceed 5 yards per mile.

There is provided therefore, an extremely simple and effective means of adjusting the route indicating device so that this latter will give accurate indications even if the tires be worn or if the tire pressure of the vehicle be at variance with the recommended pressure or, in the case where the device is driven from the speedometer, if this instrument be inaccurate.

Instead of the rod 26 being driven through the flexible shaft 50, from the speedometer, said shaft may be driven directly from the propeller shaft or the road wheels, in which case the speedometer would be driven e. g. by a flexible cable from the shaft 84. This arrangement has the advantage that correction of errors in the main indicating device automatically corrects any errors there might otherwise be in the speedometer readings, due, for example, to incorrect tire pressures or to the fact that the tires have become worn.

In a modified form of the invention shown in Figures 10 and 11 the shaft 84 is extended upwardly and carries two bevel gears 87 and 88. The bevel gear 87 meshes with a bevel gear 89 fast on one end of a shaft 90, which is supported in bearings 91 and 92, whilst the other end of the shaft 90 carries a bevel gear 93 which meshes with a bevel gear 94 fast upon an extension of the screw-threaded rod 42. The bevel gear 88 meshes with a bevel gear 95 fast on a shaft 96 which is carried in bearings 97, 98. Said shaft 96 carries also a worm 99 which meshes with a worm wheel 100 on the lower end of the shaft 26. In this modified form of the invention the carriage 43 has pivoted thereto, at points intermediate their length, two members 101 and 102 (see particularly Figure 12) each carrying at one end a half nut such as 103 whilst their other ends are formed with thumb grips 104 and are urged away from one another by a compression spring 105. Said other ends project through a slot 106 in the casing 16 of the device so that by pressing the thumb grips 104, 104 together against the action of the spring 103 the carriage 43 may be adjusted without the necessity of opening the door 12 of the device.

In another example of the invention the route card is in the form of a centrally apertured disc which is suitably positioned in a ring frictionally connected with a sleeve which is rotated through worm gearing by the mileage recording mechanism of the speedometer. In this case the sets of cam surfaces and the diagrammatic representation of the route to be followed are arranged concentrically whilst the plungers and the lamp, for focussing a pin point of light upon the representation, are suitably arranged upon a fixed part of the vehicle. Adjustment of the device to correct errors may be effected by turning the ring in the appropriate direction against frictional resistance. In this form the device of the invention may be incorporated with the speedometer, the dial of the latter being visible through the aperture in the route card.

Similarly the card of the testing device may be in the form of a disc suitably positioned in a ring frictionally connected with a sleeve which may be rotated through bevel gearing from the shaft of the testing device, a fixed pointer being provided on the casing and coacting with the scale on the card. In this case the shaft need not be screw threaded and the carriage of the testing device is not required.

In some cases, the route card may be a strip, bent to cylindrical form, the arrangement being similar to that just described except that the position of the plungers and lamp is suitably modified so that they are, e. g. radially directed.

In the foregoing it has been assumed that the improved device is for the use of the driver of a vehicle, particularly a motor car, but it is to be observed that it is equally applicable for the use of passengers on motor cars, railway trains and the like, especially to indicate points of interest on the route.

I claim:

1. A route indicating device comprising indicating lamps, an electrical circuit therefor, a route card, indicating means movable relatively to said route card and including spring pressed plungers, said route card being formed with sets of means each adapted to coact with one of said plungers during relative movement between said route card and said indicating means, driving means, including variable speed gearing, for effecting said relative movement, a subsidiary indicating device including a fixed member and a movable member, step up gearing between said driving means and said movable member, and means for interrupting at will the drive to said movable member of said subsidiary indicating device.

2. A route indicating device as claimed in claim 1 wherein the variable speed gearing includes a screw threaded shaft, a screw threaded bushing coacting therewith, a pinion on said bushing, gear wheels adapted to mesh alternatively with said pinion, and means for rotating said screw threaded shaft and serving to effect axial movement of said bush and pinion.

3. A route indicating device comprising indicating elements, a route card, indicating means movable relatively to said route card and including members adapted to coact with sets of means on said route card during relative movement between said route card and said indicating means and serving to operate the indicating elements, driving means, including variable speed gearing, for effecting said relative movement, a subsidiary indicating device including a fixed member and a movable member, step up gearing between said driving means and said movable member, and means for interrupting at will the drive to said movable member of said subsidiary indicating device.

HAROLD SIMPSON WEST.